(12) United States Patent
Thilenius et al.

(10) Patent No.: US 9,596,212 B2
(45) Date of Patent: Mar. 14, 2017

(54) APPARATUS, METHOD, AND SYSTEM FOR HARDWARE-BASED FILTERING IN A CROSS-DOMAIN INFRASTRUCTURE

(71) Applicant: The Boeing Company, Chicago, IL (US)

(72) Inventors: John M. Thilenius, Saint Louis, MO (US); David K. Liefer, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 35 days.

(21) Appl. No.: 14/076,937

(22) Filed: Nov. 11, 2013

(65) Prior Publication Data

US 2015/0135254 A1     May 14, 2015

(51) Int. Cl.
*G06F 21/00*     (2013.01)
*H04L 29/06*     (2006.01)

(52) U.S. Cl.
CPC ............ *H04L 63/0227* (2013.01); *H04L 63/02* (2013.01); *H04L 63/105* (2013.01); *G06F 2221/2113* (2013.01)

(58) Field of Classification Search
CPC .................................................. H04L 63/105
See application file for complete search history.

(56) References Cited

U.S. PATENT DOCUMENTS

| | | | |
|---|---|---|---|
| 7,681,036 B1 | 3/2010 | Zuber et al. | |
| 7,873,071 B2 | 1/2011 | Ung et al. | |
| 7,890,755 B2 | 2/2011 | Schnackenberg et al. | |
| 8,024,788 B2 | 9/2011 | Arnold et al. | |
| 2004/0243835 A1 | 12/2004 | Terzis et al. | |
| 2006/0215596 A1* | 9/2006 | Krishnaswamy | H04L 1/0002 370/328 |
| 2007/0204145 A1* | 8/2007 | Bunn et al. | 713/152 |
| 2007/0204337 A1* | 8/2007 | Schnackenberg et al. | 726/11 |
| 2008/0301799 A1* | 12/2008 | Arnold et al. | 726/14 |
| 2009/0164690 A1* | 6/2009 | Slaight | G06F 13/385 710/306 |
| 2009/0319787 A1* | 12/2009 | Price | 713/166 |
| 2010/0031342 A1* | 2/2010 | Vogsland | 726/17 |
| 2011/0023132 A1* | 1/2011 | Jelavic et al. | 726/30 |
| 2012/0047364 A1 | 2/2012 | Levy et al. | |
| 2012/0291089 A1* | 11/2012 | Bomgardner et al. | 726/1 |

(Continued)

OTHER PUBLICATIONS

RTI and Tresys Join Forces With Wind River to Announce Innovative CADRE Architecture for Building Flexible, Cost-Effective Secure Cross-Domain Solutions, http://www.rti.com/company/news/tresys-cds-framework.html, May 2, 2011.
U.S. Appl. No. 12/628,831, filed Dec. 1, 2009.
U.S. Appl. No. 13/304,514, filed Nov. 25, 2011.
U.S. Appl. No. 13/163,067, filed Jun. 17, 2011.
U.S. Appl. No. 13/713,175, filed Dec. 13, 2012.

(Continued)

*Primary Examiner* — Morshed Mehedi
(74) *Attorney, Agent, or Firm* — Kunzler Law Group, PC

(57) ABSTRACT

An apparatus for hardware-based filtering in a multi-level secure cross-domain infrastructure includes a programmable logic device that includes a filter engine in communication with a first security module. An interface module of the filter engine is configured to receive a message from the first security module. The received message being sent to a second security module, which has a different security classification than the first security module. A filter module of the filter engine is configured to filter the message data according to a message rule, which defines a data compliance requirement associated with the security classification of the second security module. A routing module is configured to provide the message to the second security module in response to the message data complying with the message rule.

21 Claims, 7 Drawing Sheets

(56) References Cited

U.S. PATENT DOCUMENTS

2013/0250803 A1* 9/2013 Abraham ............... H04L 67/16
                                                    370/254
2014/0337410 A1* 11/2014 Mraz et al. .................... 709/203

OTHER PUBLICATIONS

European Search Report for Application No. 14179330.7 dated Mar. 18, 2015.

* cited by examiner

APPARATUS, METHOD, AND SYSTEM FOR HARDWARE-BASED FILTERING IN A CROSS-DOMAIN INFRASTRUCTURE

FIELD

This disclosure relates to network communication and more particularly to transferring data across security domains using hardware-based data filtering.

BACKGROUND

In general, a cross-domain solution ("CDS") is a means of information assurance that provides the ability to transfer information between two incompatible security domains. In order to allow information to be transmitted from one security domain to an incompatible security domain, a CDS may filter the information to ensure the data complies with a security policy associated with the incompatible security domain.

A traditional CDS may filter data being transferred between two incompatible security domains using a software application. However, software filtering may be inefficient for certain CDS s that require efficient and responsive filtering results. Moreover, unlike traditional CDS s that generally only allow transferring data between two incompatible security domains, it may be desirable to implement a CDS that allows data transfers between more than two incompatible security domains.

SUMMARY

The subject matter of the present application has been developed in response to the present state of the art, and in particular, in response to the problems and needs of cross-domain data filtering that have not yet been fully solved by currently available systems. For example, although conventional cross-domain solutions ("CDS") provide software-based filtering, such software-based filtering approaches may not provide efficient and responsive filtering results for some CDSs. Further, a hardware-based approach to CDS filtering may allow data transfers between more than two incompatible security domains, higher throughput, lower end-to-end latency, and also provides a CDS filtering approach in a smaller form factor than traditional CDS s. Generally, the subject matter of the present application has been developed to provide a CDS that utilizes an apparatus, system, or method for hardware-based filtering in a cross-domain infrastructure that overcomes at least some of the above-discussed shortcomings of prior art CDSs.

An apparatus is provided for hardware-based filtering in a multi-level secure cross-domain infrastructure. In one embodiment, a programmable logic device includes a filter engine in communication with a first security module. An interface module located on the filter engine, in certain embodiments, is configured to receive a message from the first security module. In one embodiment, the message is sent from the first security module to a second security module. In another embodiment, the second security module comprises a different security classification than the first security module.

In a further embodiment, the apparatus includes a filter module located on the filter engine configured to filter data contained within the message according to a message rule. In certain embodiments, the message rule defines a data compliance requirement associated with the security classification of the second security module. In one embodiment, the apparatus includes a routing module configured to provide the message to the second security module in response to the message data complying with the message rule.

In another embodiment, the first security module and the second security module are located on a single programmable logic device. In some embodiments, the single programmable logic device is in communication with the programmable logic device comprising the filter engine. In yet another embodiment, the first security module is located on a first programmable logic device and the second security module is located on a second programmable logic device. In one embodiment, the first and second programmable logic devices are in communication with the programmable logic device comprising the filter engine.

In a further embodiment, the apparatus further includes a third security module having a different security classification than each of the first and second security modules wherein the third security module is in communication with a third filter engine. The apparatus, in another embodiment, includes an interface module of the third filter engine that is configured to receive a message from the third security module. In some embodiments, the message is sent from the third security module to one of the first security module and the second security module. A filter module of the third filter engine, in certain embodiments, is configured to filter data contained within the message according to a message rule. In one embodiment, the message rule defines a data compliance requirement associated with the security classification of one of the first and second security modules. A routing module, in a further embodiment, provides the message data to one of the first and second security modules in response to the message data complying with the message rule.

In one embodiment, the programmable logic device comprising the filter engine includes one or more functional partitions where each functional partition comprises a filter engine associated with a security module. In certain embodiments, the filter engine executing an instance of a filtering firmware. In another embodiment, the programmable logic device comprising the filter engine includes one or more physical partitions where each physical partition comprises a filter engine associated with a security module.

In another embodiment, the interface module verifies the message includes an expected message type. In one embodiment, the message type is associated with a rule file comprising one or more rules. The interface module, in certain embodiments, checks a configuration table for a rule file. The configuration table, in some embodiments, stores one or more rule files associated with a message type. The message type, in a further embodiment, is an index into the configuration table.

In another embodiment, the apparatus further includes a rule module configured to determine a rule associated with the message. In certain embodiments, the rule is selected from a rule file. In another embodiment, one or more predetermined match fields associated with the message data are compared with one or more predetermined match fields associated with a rule such that the rule is selected in response to the predetermined match fields associated with the message data matching the predetermined match fields associated with the rule.

In yet another embodiment, the filter module performs a filtering action on the message data as specified according to the message rule. In one embodiment, the filtering action includes a validation action verifying the message data complies with the message rule, the message data being compared to the message rule, a data zeroizing action zeroing-out message data according to the message rule, a data pass-thru action forwarding the message data to the second security module without processing the message data, a data replace action replacing a value of the message data with a different value, and/or a data modification action modifying a value of the message data by performing a modification operation on the value.

A method for hardware-based filtering in a multi-level secure cross-domain infrastructure is also provided. In one embodiment, the method receives a message from a first security module at a filter engine located on a programmable logic device. In certain embodiments, the message is sent from the first security module to a second security module. In a further embodiment, the second security module comprises a different security classification than the first security module.

The method further includes filtering data contained within the message according to a message rule, which defines a data compliance requirement associated with the security classification of the second security module. In another embodiment, the method provides the message to the second security module in response to the message data complying with the message rule.

In another embodiment, the first security module and the second security module are located on a single programmable logic device. In some embodiments, the single programmable logic device is in communication with the programmable logic device comprising the filter engine. In yet another embodiment, the first security module is located on a first programmable logic device and the second security module is located on a second programmable logic device. In one embodiment, the first and second programmable logic devices are in communication with the programmable logic device comprising the filter engine.

In one embodiment, the programmable logic device comprising the filter engine includes one or more functional partitions where each functional partition comprises a filter engine associated with a security module. In certain embodiments, the filter engine executing an instance of a filtering firmware. In another embodiment, the programmable logic device comprising the filter engine includes one or more physical partitions where each physical partition comprises a filter engine associated with a security module.

In another embodiment, the method verifies the message includes an expected message type. In one embodiment, the message type is associated with a rule file comprising one or more rules. The method, in certain embodiments, checks a configuration table for a rule file. The configuration table, in some embodiments, stores one or more rule files associated with a message type. The message type, in a further embodiment, is an index into the configuration table.

In another embodiment, the method further includes determining a rule associated with the message. In certain embodiments, the rule is selected from a rule file. In another embodiment, one or more predetermined match fields associated with the message data are compared with one or more predetermined match fields associated with a rule such that the rule is selected in response to the predetermined match fields associated with the message data matching the predetermined match fields associated with the rule.

In yet another embodiment, the method performs a filtering action on the message data as specified according to the message rule. In one embodiment, the filtering action includes a validation action verifying the message data complies with the message rule, the message data being compared to the message rule, a data zeroizing action zeroing-out message data according to the message rule, a data pass-thru action forwarding the message data to the second security module without processing the message data, a data replace action replacing a value of the message data with a different value, and/or a data modification action modifying a value of the message data by performing a modification operation on the value.

A system for hardware-based filtering in a multi-level secure cross-domain infrastructure is included. In one embodiment, the system includes a single board computer comprising a first security module. In another embodiment, the system includes a programmable logic device comprising a filter engine, the filter engine in communication with the first security module. In a further embodiment, the system includes an interface module located on the filter engine that is configured to receive a message from the first security module. In one embodiment, the message is sent from the first security module to a second security module. In another embodiment, the second security module comprises a different security classification than the first security module.

In a further embodiment, the system includes a filter module located on the filter engine configured to filter data contained within the message according to a message rule. In certain embodiments, the message rule defines a data compliance requirement associated with the security classification of the second security module. In one embodiment, the system includes a routing module configured to provide the message to the second security module in response to the message data complying with the message rule.

In another embodiment, the system further includes a network interface controller ("NIC") configured to receive a network packet that includes a security classification label. In one embodiment, the network packet is received at a offload engine on the NIC, which has the same security classification as the network packet. In certain embodiments, the network packet includes a message, which is forwarded to a security module on the single board computer that has the same security classification as the network packet.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1A:
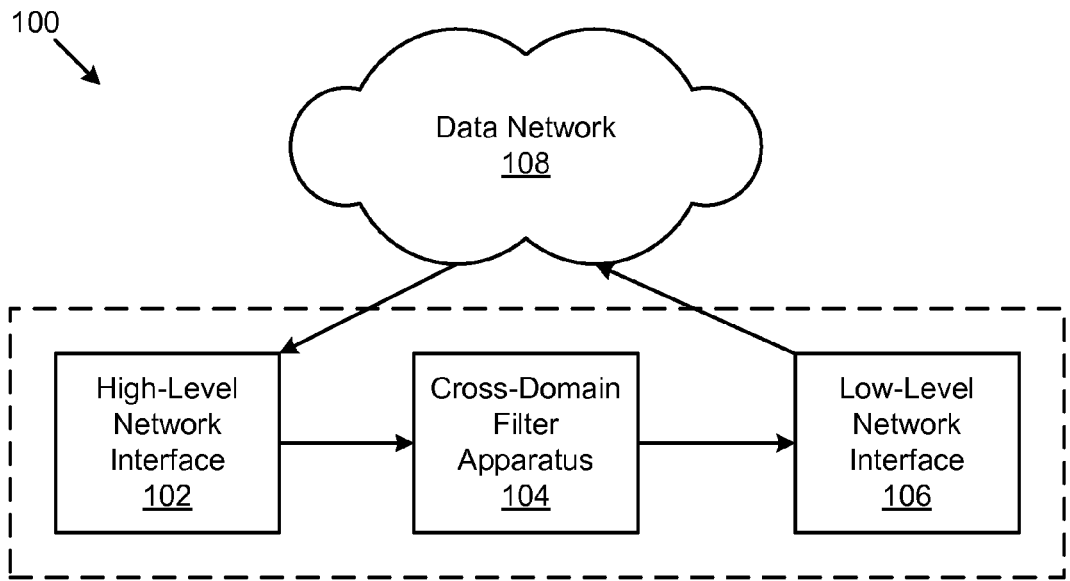
FIG. 1A is a schematic block diagram illustrating one embodiment of a system for hardware-based filtering in a cross-domain infrastructure.

FIG. 1A depicts one embodiment of a system 100 for hardware-based filtering in a cross-domain infrastructure. In one embodiment, the system 100 includes a high-level network interface 102, a cross-domain filter apparatus 104, a low-level network interface 106, and a data network 108, which are described in more detail below. In certain embodiments, the high-level network interface 102, the cross-domain filter apparatus 104, and the low-level network interface 106 are located on the same logic device, such as a single board computer ("SBC"). In some embodiments, the high-level network interface 102, the cross-domain filter apparatus 104, and the low-level network interface 106 are located on different logic devices and are communicatively coupled to each other. In certain embodiments, the high-level network interface 102 is associated with a higher level of security than the level of security associated with the low-level network interface 106.

The high-level network interface 102, in one embodiment, is a physical network interface that receives data from the data network 108, which can be a data network, and sends the network data to a cross-domain filter apparatus 104. In another embodiment, the high-level network interface 102 receives network data transmitted over a wired network connection, such as an Ethernet connection. In some embodiments, the high-level network interface 102 receives network data transmitted over a wireless network connection, such as a Wi-Fi connection, a Bluetooth® connection, a near-field communication ("NFC") connection, and/or the like. The network data, in a further embodiment, includes a security classification such that only data recipients that have the same security clearance as the network data are able to view the network data.

The cross-domain filter apparatus 104, in certain embodiments, filters the network data received from the high-level network interface 102 to ensure the network data complies with the security classification of the data recipient communicatively connected to the low-level network interface 106. In one embodiment, the cross-domain filter apparatus 104 includes one or more programmable logic devices. In one embodiment, the programmable logic device includes a field-programmable gate array ("FPGA"). In another embodiment, the programmable logic device includes an application-specific integrated circuit ("ASIC"), which consumes less power and is less expensive at volume than traditional programmable logic devices. One of skill in the art will recognize other integrated circuits that may be embodied as a programmable logic device.

In one embodiment, the cross-domain filter apparatus 104 is embodied as a programmable logic device such that network data filtering is performed on one or more physical partitions of the programmable logic device. In certain embodiments, the one or more physical partitions of the programmable logic device each execute an instance of a filtering firmware that controls how the one or more physical partitions filter the network data. In some embodiments, the network data filtering is performed on one or more partitions of the programmable logic device that are functionally isolated, where each functional partition executes an instance of a filtering firmware.

The cross-domain filter apparatus 104 (also known as a "cross-domain guard"), in certain embodiments, determines whether to allow network data through to a higher or lower security level via the high-level network interface 102 or low-level network interface 106. In one embodiment, network data is transmitted to the low-level network interface 106, and eventually to the data recipient, if the security classification of the network data meets the security classification of the data recipient. The cross-domain filter apparatus 104, and its filtering operations, will be discussed in more detail below with reference to FIGS. 4 and 5.

The low-level network interface 106, in one embodiment, is substantially similar to the high-level network interface 102. In certain embodiments, the low-level network interface 106 is a physical network interface that receives data from a cross-domain filter apparatus 104 and sends the network data to a data recipient through the network 108. In one embodiment, the low-level network interface 106 sends network data over a wired network connection, such as an Ethernet connection. In some embodiments, the low-level network interface 106 sends network data over a wireless network connection, such as a Wi-Fi connection, a Bluetooth® connection, a near-field communication ("NFC") connection, and/or the like. The network data, in a further embodiment, includes a security classification such that only data recipients that have the same security clearance as the network data are able to view the network data. In some embodiments, the security classification of the network data sent by the low-level network interface 106 is different than the security classification of the data received by the high-level network interface 102.

The system 100, in certain embodiments, includes a data network 108. The network 108, in certain embodiments, is a data network 108 that transmits digital communications having different security classifications. The data network 108, in one embodiment, includes a wireless network, such as a wireless telephone network, a local wireless network, such as a Wi-Fi network, a Bluetooth® network, and the like. The data network 108, in another embodiment, includes a wide area network ("WAN"), a storage area network ("SAN"), a local area network ("LAN"), an optical fiber network, the internet, or other data network known in the art. The data network 108, in certain embodiments, includes two or more networks. In a further embodiment, the data network 108 includes one or more servers, routers, switches, and/or other networking equipment. The data network 108, in another embodiment, also includes computer readable storage media, such as a hard disk drive, a mass storage unit, an optical drive, non-volatile memory, random access memory ("RAM"), or the like. In certain embodiments, the data network 108 is two physically separate data networks such that each respective data network is coupled to one of the high-level network interface 102 and the low-level network interface 106.

Figure 1B:
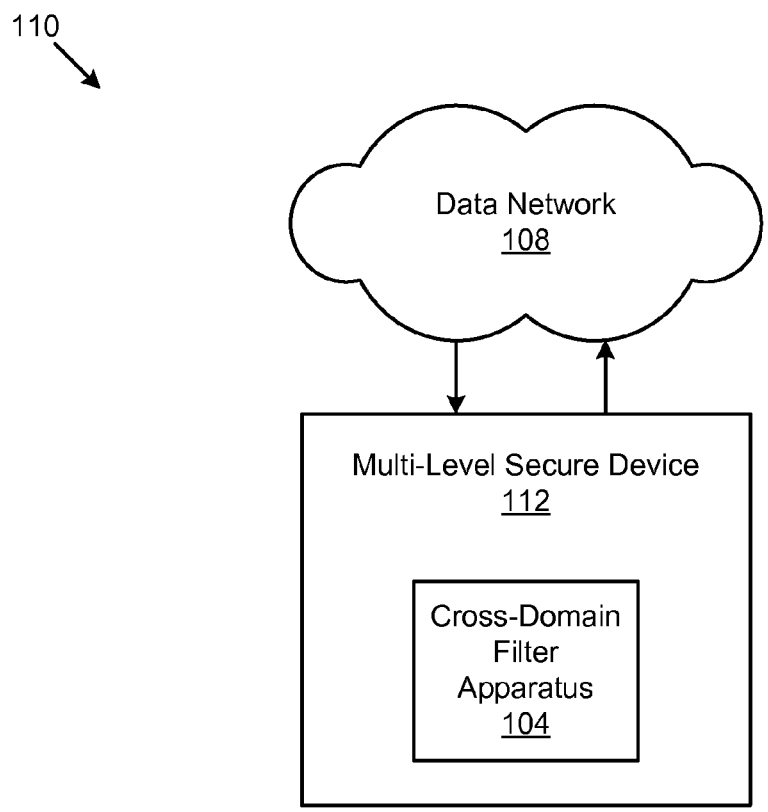
FIG. 1B is a schematic block diagram illustrating one embodiment of a system for hardware-based filtering in a multi-level secure cross-domain infrastructure.

FIG. 1B depicts one embodiments of a system 110 for hardware-based filtering in a multi-level secure cross-domain infrastructure. The system 110, in certain embodiments, includes a cross-domain filter apparatus 104 and a data network 108, which are substantially similar to the cross-domain filter apparatus 104 and the data network 108 described with reference to FIG. 1A. The system 110, in one embodiment, also includes a multi-level security device 112, which is described below in more detail.

The multi-level security device 112, in one embodiment, includes one or more networking components, such as one or more physical networking interfaces that are in communication with the network 108, one or more network interface controllers ("NICs"), and a cross-domain filter apparatus 104. Additionally, in some embodiments, a multi-level secure ("MLS") SBC, which is commonly referred to as a host computer, is also included. In certain embodiments, the components of the multi-level security device 112 are located on a single assembly and/or includes one or more components located on separate assemblies that are communicatively coupled to each other.

In one embodiment, the multi-level security device 112 is an embeddable module that has a small form-factor with low size, weight, and power attributes. In another embodiment, the multi-level security device 112 provides a higher-throughput data transfer rate as compared to traditional CDS approaches performed substantially in software. In certain embodiments, the multi-level security device 112 offloads processing cycles associated with message filtering that are normally performed on the SBC to a separate programmable logic device, such as an FPGA, which releases processor cycles on the SBC to be used for other computational work. Further, in another embodiment, hardware-based CDS approaches provide more robust and secure solutions than traditional software-based CDS approaches because hardware-based solutions provide a physical separation of security levels. This is especially beneficial for applications that are sensitive to size, weight, and power because the processor is generally not as powerful. In one embodiment, one or more of the above-described advantages are provided in a hardware-based CDS approach, as described herein.

The multi-level security device 112, in some embodiments, also includes commercial-off-the-shelf ("COTS") components, such as an SBC, and other industry standard components. In certain embodiments, using COTS and other industry standard components allows the multi-level security device 112 to be easily upgradeable. In some embodiments, the multi-level security device 112 includes one or more standard bus interfaces, such as a PCI Express mezzanine card ("XMC"), which are communicatively coupled to an SBC. For example, a multi-level security device 112 that includes one or more NIC XMCs and one or more cross-domain filter apparatus 104 XMCs is communicatively coupled to the SBC using a PCI Express bus. In one embodiment, various standardized and/or proprietary bus architectures, such as PCI Express, are used to communicatively couple the NIC XMCs and the cross domain filter apparatus 104 XMCs to the SBC.

Figure 3:
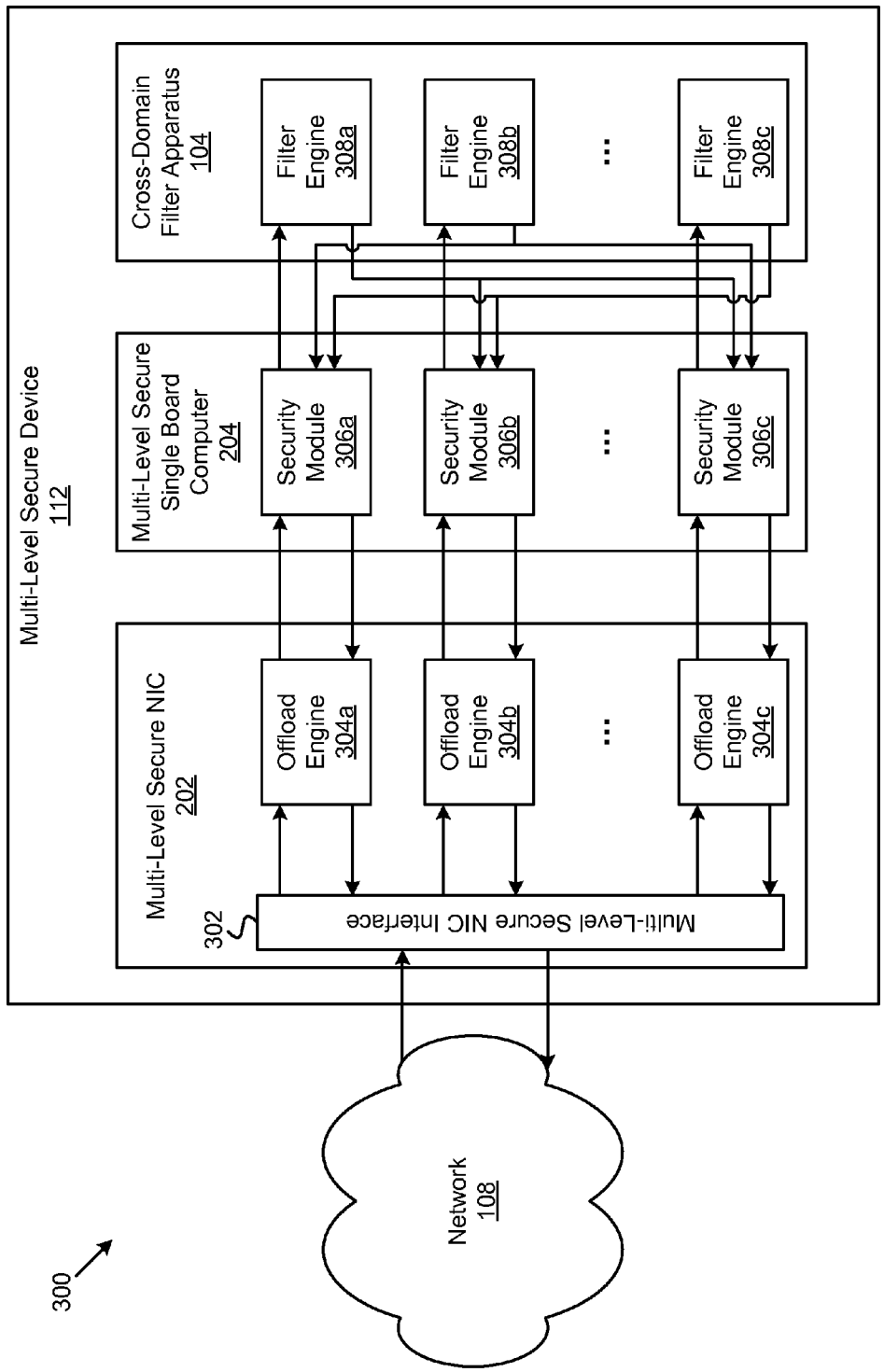
FIG. 3 is a schematic block diagram illustrating a further embodiment of a system for hardware-based filtering in a multi-level secure cross-domain infrastructure.

In certain embodiments, the multi-level security device 112 includes a multi-level secure ("MLS") operating system. As used herein, MLS is the application of a computer system to process information having incompatible security classifications and to prevent users from obtaining access to information for which they lack authorization. In one embodiment, the multi-level security device 112 includes a multiple independent levels of security ("MILS") architecture, such as VxWorks® MILS separation kernel manufactured by Wind River of Alameda, Calif. or "Integrity" real-time operating system ("RTOS") manufactured by Green Hills Software of Santa Barbara, Calif., which isolates each level of information within its own single level embodiment. In certain embodiments, the multi-level security device 112 includes one or more security modules 306*a-c*, as depicted in FIG. 3, which isolate information with different security classifications.

Figure 2:
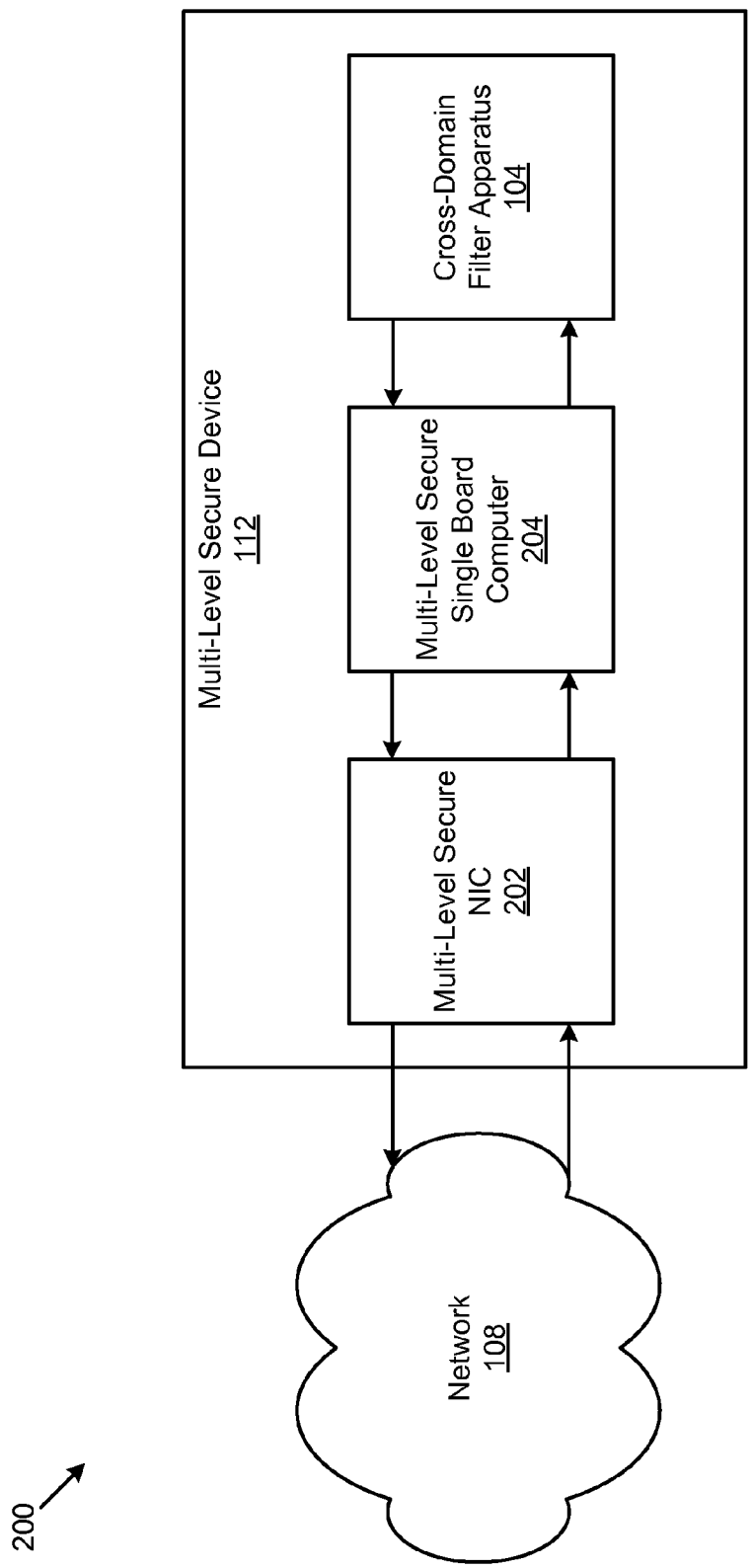
FIG. 2 is a schematic block diagram illustrating another embodiment of a system for hardware-based filtering in a multi-level secure cross-domain infrastructure.

In another embodiment, by implementing the MILS architecture, together with one or more NIC XMCs and cross-domain filter apparatus 104 XMCs devices, the multi-level security device 112 is able to transfer data between multiple security modules 306*a-c* having different security classifications. For example, a level-1 security module 306*a* transfers data having a level-1 security classification to a level-2 security module 306*b*, reclassifying the data with a level-2 security classification in response to the data successfully passing through the filter engine 308*a* associated with the level-1 security module 306*a* and located within the cross-domain filter apparatus 104. FIG. 2 depicts another embodiment of a system 200 for hardware-based filtering in a multi-level secure cross-domain infrastructure. In one embodiment, the system 200 includes a network 108 and a multi-level secure device 112. In another embodiment, the multi-level secure device includes a multi-level secure NIC 202, a multi-level secure SBC 204, and a cross-domain filter apparatus 104, which are described below.

In one embodiment, the multi-level secure NIC 202 receives network packets from one or more senders connected to the network 108. In another embodiment, network packets are received on a physical network interface associated with the multi-level secure NIC 202. In one embodiment, the multi-level secure NIC 202 receives network data at one or more offload engines 304*a-c*, as described with reference to FIG. 3, that have the same security classification as the network packet. In certain embodiments, the network packets include a security classification label that determines the security clearance necessary to view the data within a network packet. The multi-level secure NIC 202, in one embodiment, determines whether the security classification of the network packet matches a security policy associated with the multi-level secure device 112. In another embodiment, if the network packet matches a security policy associated with the multi-level security device 112, the multi-level secure NIC 202 forwards the network packet data to the multi-level secure SBC 204.

The multi-level secure SBC 204, in certain embodiments, includes a MILS architecture that employs one or more separation mechanisms to ensure a high-assurance security architecture within the multi-level secure SBC 204. In one embodiment, the MILS architecture implements a functional separation mechanism, such as a separation kernel, a partitioning kernel, and/or the like. In some embodiments, the MILS architecture implements a physical separation mechanism, such as independent processors operating at specified security classifications, to provide physical partitions. In this manner, the multi-level secure SBC 204 is able to keep information isolated within separate security partitions and control the information flow to/from partitions and/or between partitions. In certain embodiments, a partition with a security classification on the multi-level secure SBC 204 receives data from the multi-level secure NIC 202 having the same security classification. For example, a network packet comprising data having a level-1 security classification is forwarded to a security module 306*a-c*, as described in FIG. 3, which receives level-1 classified data.

In one embodiment, the network packet data includes one or more messages that comprise a message type. The message type, in certain embodiments, includes various data formats, such as text formats, image formats, video formats, audio formats, and/or the like. In certain embodiments, a message includes a collection of message data. The message data, in another embodiment, includes one or more data types, such as integers, characters, bytes, floats, and/or the like. As described below, in one embodiment, a message is passed to the one or more filter engines 308*a-c* where the message data contained within the message is compared against one or more rules associated with the message in order to verify the message complies with the security classification requirements of a destination security module 306*a-c*.

In one embodiment, the multi-level secure SBC 204 forwards a message from a first security module 306*a-c* to a second security module 306*a-c*. In some embodiments, the first security module 306*a-c* has a different security classification than the second security module 306*a-c*. In further embodiments, the message is forwarded from the first security module 306*a-c* to a cross-domain filter apparatus 104 that ensures the message data complies with the security classification associated with the second security module 306*a-c*. For example, the cross-domain filter apparatus 104 compares the message data against one or more rules associated with the second security module 306*a-c* to ensure that the message data is formatted in such a way that message data not intended for the second security module 306*a-c* is redacted or modified. In some embodiments, the cross-domain filter apparatus 104 discards a message not meeting the security classification requirements of the second security module 306*a-c* in order to prevent it from being forwarded to the second security module 306*a-c*.

FIG. 3 depicts a further embodiment of a system 300 for hardware-based filtering in a multi-level secure cross-domain infrastructure. In one embodiment, the system includes a network 108 and a multi-level secure device 112, which are substantially similar to the network 108 and the multi-level secure device 112 described with reference to FIGS. 1 and 2. In another embodiment, the system 300 includes a multi-level secure NIC 202, a multi-level secure SBC 204, and a cross-domain filter apparatus 104, which are substantially similar to the multi-level secure NIC 202, a multi-level secure SBC 204, and a cross-domain filter apparatus 104 described with reference to FIG. 2. In a further embodiment, the system 300 includes a NIC interface 302, one or more offload engines 304*a-c* located on the multi-level secure NIC 202, one or more security modules 306*a-c* located on the multi-level secure SBC 204, and one or more filter engines 308*a-c* located on the cross-domain filter apparatus 104, which are described in more detail below.

In one embodiment, the multi-level secure NIC interface 302 receives one or more data packets from the network 108. In certain embodiments, the data packets include a security classification label. The multi-level secure NIC interface 302, in one embodiment, reads the security label and forwards the network data to an offload engine 304*a-c* having the same security classification as the network data's security classification label. In certain embodiments, if the security classification label associated with the network data does not match a classification level of a security policy, the multi-level secure NIC interface 302 will prevent the network data from being forwarded to one or more of the offload engines 304*a-c*.

In another embodiment, the one or more offload engines 304*a-c* located on the multi-level secure NIC 202 process the network packet and forward the message of the network packet to an associated security module 306*a-c* that has the same security classification as the network packet. In certain embodiments, the offload engine 304*a-c* removes the security classification label from the message and forwards the message to the appropriate security module 306*a-c* according to the security classification label. For example, data having a level-1 security classification label is forwarded to the offload engine 304*a* (e.g., offload engine 1) associated with the security module 306*a* (e.g., security module 1) having the same security classification as the message, which forwards the message to the security module 306*a*. In this manner, the message is isolated and forwarded to the appropriate security module 306*a-c* and not to another security module 306*a-c* having a different security classification.

In certain embodiments, the message is transferred to/from the offload engine 304*a-c* to the security module 306*a-c* using a high-assurance bus interface that utilizes direct memory access ("DMA"). In one embodiment, high-assurance is ensured by utilizing additional integrity checks on the memory ranges. In certain embodiments, various legacy, current generation, and next generation standardized bus architectures are used, including both serial and parallel, to transfer data between the NIC 202 XMC, the multi-level secure SBC 204, and the cross domain filter apparatus 104 XMC. These standardized bus architectures, in some embodiments, include Multibus I and II, VME bus, PCI bus, PCI Express bus, Serial ATA, USB 1.0/2.0/3.0, 12C, Hyper Transport, and/or the like. A selected bus architecture, in one embodiment, is dependent on the requirements and environment associated with where the cross-domain filter apparatus 104 is hosted.

In one embodiment, the one or more security modules 306*a-c* located on the multi-level secure SBC 204 receives messages forwarded by the offload engines 304*a-c* located on the multi-level secure NIC 202. In one embodiment, a security module 306*a-c* is a physical partition of a MILS-enabled multi-level secure SBC 204. In another embodiment, a security module 306*a-c* is a logical partition of a MILS-enabled multi-level secure SBC 204. The multi-level secure SBC 204, in some embodiments, includes any number of security modules 306*a-c*, which determine the number of offload engines 304*a-c* and the number of filter engines 308*a-c* used within the multi-level secure device 112.

Each security module 306*a-c*, in some embodiments, represents an isolated security domain that is incompatible with other security modules 306*a-c*. For example, a message sent to a security module 306*a-c* having a level-1 security classification is not compatible with a security module 306*a-c* having a level-2 security classification. In certain embodiments, a message is forwarded to a filter engine 308*a-c* associated with the security module 306a-c in order to facilitate message transfer between security modules 306a-c. For example, a message sent to a security module 306a-c having a level-1 security classification is forwarded to a security module 306a-c having a level-2 security classification as long as the filter engine 308a-c associated with the level-1 security module 306a-c validates the message data is compatible with the level-2 security module 306a-c. In a further embodiment, the sent message skips one or more security levels. For example, a message sent to a security module 306a-c having a level-1 security classification is forwarded to a security module 306a-c having a level-4 security classification as long as the filter engine 308a-c associated with the level-1 security module 306a-c validates the message data is compatible with the level-4 security module 306a-c.

In certain embodiments, a security module 306a-c executes a computer program product that facilitates message transfer between the offload engine 304a-c and the security module 306a-c and between the security module 306a-c and the filter engine 308a-c. In one embodiment, a security module 306a-c includes a proxy application that facilitates sending and/or receiving message data over a network connection. In certain embodiments, the proxy application supports various transmission protocols, such as UDP, TCP, DDS, or the like. In one embodiment, the proxy program is configured to send and/or receive specific types of network message data over specific transmission protocols. For example, the proxy program is configured to receive a message named "Example_Message" over the TCP protocol only such that if a message with the same name is received over the UDP protocol, the proxy program will prevent the message from being forwarded to the filter engines 308a-c. In certain embodiments, however, the same network message data is received over various network protocols and the proxy program forwards the received network message data to an appropriate destination.

In a further embodiment, a security module 306a-c includes a driver program that facilitates transferring messages from the security module 306a-c to the one or more filter engines 308a-c. In certain embodiments, the driver program transfers messages from the security module 306a-c to and/or from the filter engine 308a-c using a high-assurance standardized bus interface that utilizes DMA.

In some embodiments, a filter engine 308a-c located on the cross-domain filter apparatus 104 receives messages from a first security module 306a-c and forwards the messages to a second security module 306a-c that has a different security classification than the first security module 306a-c. In some embodiments, the filter engines 308a-c are isolated from each other using fencing or logical isolation, but are co-located on a single programmable logic device comprising the cross-domain filter apparatus 104. In another embodiment, the filter engines 308a-c are physically isolated from one another by residing on separate programmable logic devices each running independent instances of filtering firmware and communicating using a standard interface, such as a high-speed parallel or serial interface. In such an embodiment, the collection of filter engines 308a-c implemented using separate programmable logic devices would comprise the cross-domain filter apparatus 104 as shown in FIG. 3.

In one embodiment, and as described below with reference to FIGS. 4 and 5, the filter engine 308a-c ensures the message data complies with one or more rules associated with the message and its data. A message rule, in one embodiment, defines the requirements regarding how data should be configured in order to comply with a security classification of a particular security module 306a-c. In another embodiment, the filter engine 308a-c forwards the message to the second security module 306a-c in response to the message data complying with the one or more rules. In a further embodiment, the filter engine 308a-c prevents the message from being forwarded to the second security module 306a-c in response to the message data not complying with one or more rules. In certain embodiments, the filter engines 308a-c modify the message data in order to make the message data comply with the requirements of the one or more rules. For example, the filter engine 308a-c redacts message data, such as zeroing-out bytes and/or bits, such that the message data is forwarded to a second security module 306a-c that has a different security classification than the first security module 306a-c.

In certain embodiments, the filter engines 308a-c are implemented in a cascading architecture such that each filter engine 308a-c is associated with the same security module, such as security module 306a. In one embodiment, the cascading filter engines 308a-c implement a parallel design, where two or more messages are processed at the same time. Such an embodiment increases overall performance because more than one message could be filtered at the same time. In another embodiment, the cascading filter engines 308a-c implement a serial design. Such an embodiment provides redundancy (e.g., by filtering the message with the same rules one or more times) and/or the ability to send messages from a specific security level to multiple different security levels. For example, to send a message from security module 306a to security module 306b and security module 306c, security module 306a sends the message to filter engine 308a twice, once with an associated rule for forwarding the message to security module 306b and again with an associated rule for forwarding the message to security module 306c.

Figure 4:
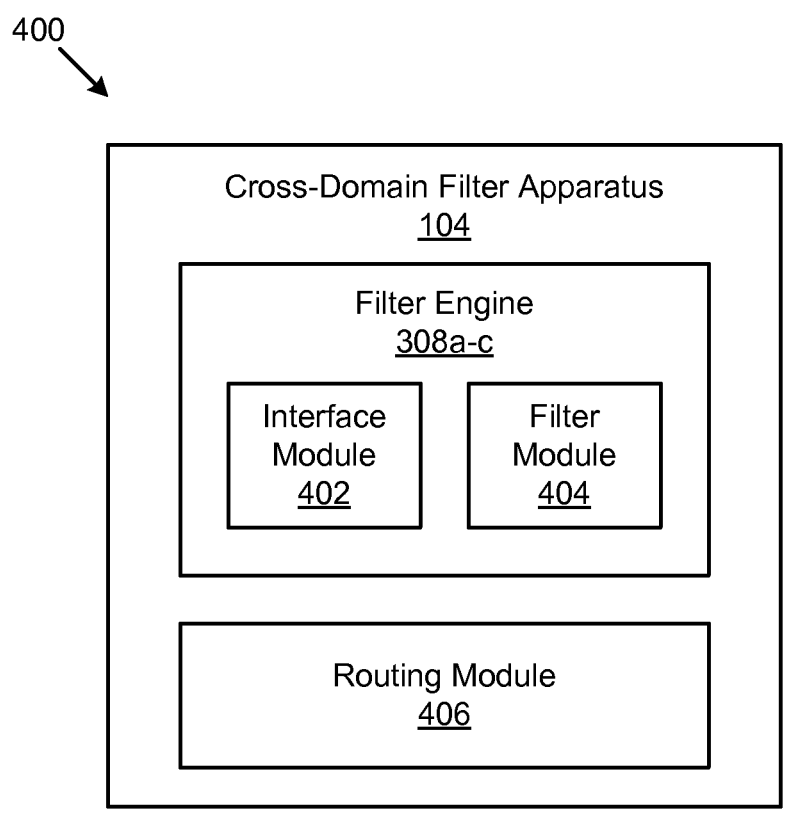
FIG. 4 is a schematic block diagram illustrating one embodiment of a cross-domain filter apparatus.

FIG. 4 depicts one embodiment of an apparatus 400 that includes a cross-domain filter apparatus 104. In certain embodiments, the cross-domain filter apparatus 104 includes one or more filter engines 308a-c, which are substantially similar to the filter engines 308a-c described with reference to FIG. 3, an interface module 402, a filter module 404, and a routing module 406, which are described in more detail below. In certain embodiments, the interface module 402 and the filter module 404 are located on the filter engine 308a-c.

In one embodiment, the cross-domain filter apparatus 104 includes an interface module 402 configured to receive one or more messages associated with a first security module 306a-c. In some embodiments, at least one filter engine 308a-c is associated with the first security module 306a-c. The interface module 402, in another embodiment, receives messages from a security module 306a-c on a physical interface of the programmable logic device (e.g., a standardized bus interface). In some embodiments, the physical interface includes a high-assurance standardized bus interface that uses DMA to access messages stored in a memory component. The physical interface, in some embodiments, ensures that messages sent from the first security module 306a-c are received by the interface module 402 of the filter engine 308a-c associated with the security module 306a-c. In this manner, messages are isolated from other security modules 306a-c and/or filter engines 308a-c that do not have the correct security classification to access the message data.

In certain embodiments, the interface module 402 verifies a message is an expected message type. In some embodiments, the message type is associated with one or more rules of a rule file or ruleset. In one embodiment, the interface module 402 searches a configuration/validation data table for one or more rule files based on the message type. For example, a message type including a unique message name, such as "DataConfig1," is used by the interface module 402 as an index into a configuration data table to check if there is message rule data associated with that message type. In another example, the message includes a digital signature that the interface module 402 verifies the integrity of in order to determine the message is an expected message type.

If the interface module 402, in some embodiments, cannot match a rule and/or rule file to the message, the interface module 402 prevents the message from being filtered and forwarded to the destination security module 306a-c because the message is not a valid message type. In a further embodiment, if the interface module 402 determines the message is an expected message type, the interface module 402 applies a header to the message before the message is forwarded to the filter engine 308a-c. The message header describes the rule file to be used and any other descriptive information associated with the message, such as the destination security module 306a-c, the size of the message, and/or the like.

In another embodiment, the cross-domain filter apparatus 104 includes a filter module 404 configured to filter the message data (e.g., elements or data types within the message) according to one or more message rules. In some embodiments, the filter engines 308a-c use one or more filter modules 404 to perform one or more filtering operations by comparing the message data to the one or more rules associated with the message. In one embodiment, the rules are grouped in a rule file, which is selected based on the message type. In another embodiment, the filter module 404 determines the rule file associated with the message based on the first and second security modules 306a-c (e.g., the security module 306a-c where the message is coming from and the security module 306a-c where the message is intended to go).

The filter module 404, in one embodiment, verifies that message data being sent from a first security module 306a-c complies with one or more rules before being forwarded to a second security module 306a-c. The filter module 404, in certain embodiments, compares the rules to the contents and/or values of the message data. For example, a rule comprises one or more constraints that determine what values the message data should contain in order to be forwarded from a first security module 306a-c to a second security module 306a-c.

In certain embodiments, the filter module 404 performs low-level data inspection to examine the message data at the byte and/or bit level and compares bytes and/or bits to one or more rules defining what each byte and/or bit field should be in order to be transmitted to a destination security module 306a-c, e.g., bytes 1-4 should be an integer with a value of 10, bytes 5-8 should be a float between the values of 1 and 2, byte-9 should be a character with a value of 'A', and/or the like. In one embodiment, if the message data does not comply with the rules, the filter module 404 does not forward the message data to a destination security module 306a-c.

In another embodiment, a rule is associated with the message data, a first security module 306a-c, and a second security module 306a-c. For example, the filter module 404 compares the message data to one or more rules associated with a message being transmitted from a first security module 306a-c to a second security module 306a-c. If the message data does not comply with one or more requirements of the rule, or if the message does not match a message type expected to be transmitted from the first security module 306a-c to the second security module 306a-c, the filter module 404 discards the message in order to prevent the message from being sent to the second security module 306a-c. In some embodiments, as described below with reference to FIG. 5, a data modification module 512 modifies the message data to make the message data compliant with one or more rules such that the filter module 404 can forward the message to the second security module 306a-c.

In certain embodiments, the cross-domain filter apparatus 104 includes a routing module 406 configured to provide the message to a second security module 306a-c in response to the message data complying with the one or more rules associated with the message. In one embodiment, the second security module 306a-c has a different security classification than the first security module 306a-c. The routing module 406, in another embodiment, reads a header associated with the message to determine the destination security module 306a-c to send the message to. In some embodiments, the routing module 406 removes the header from the message. In another embodiment, the routing module 406 sanitizes the header by removing sensitive message data, e.g., by zeroing out any bytes/bits representing sensitive message data not intended to be accessed by second security module 306a-c.

In certain embodiments, the routing module 406 provides the message to a second security module 306a-c using a memory component. In some embodiments, the routing module 406 uses a memory component in conjunction with the high-assurance standardized bus interface and DMA. Thus, the second security module 306a-c, in some embodiments, receives the message by reading it from the memory component where the routing module 406 stored the message.

In certain embodiments, a third security module 306a-c is included on the multi-level secure SBC 204 that has a different security classification than each of the first and second security modules 306a-c. In one embodiment, the third security module 306a-c is substantially similar to the first and/or second security modules 306a-c. In another embodiment, the third security module 306a-c is associated with at least one filter engine 308a-c.

In one embodiment, the interface module 402 receives messages associated with the third security module 306a-c over a standardized bus interface. In another embodiment, the filter module 404 filters the message data according to at least one rule associated with the message and the routing module 406 provides the message to either the first or second security modules 306a-c in response to the message data complying with the at least one rules associated with the message. In some embodiments, the third security module 306a-c has a different security classification than the first and second security modules 306a-c.

In certain embodiments, any number of security modules 306a-c are included, with each having an associated filter engine 308a-c located on a programmable logic device, which facilitates transmitting messages between security modules 306a-c that have different security classifications. For example, in a system with four security modules 306a-c, a first security module 306a-c sends messages to a second, third, and/or fourth security module 306a-c using an associated filter engine 308a-c that ensures the message data from the first security module 306a-c complies with the security classification requirements, as defined in one or more rules, associated with the second, third, and fourth security modules 306a-c.

Figure 5:
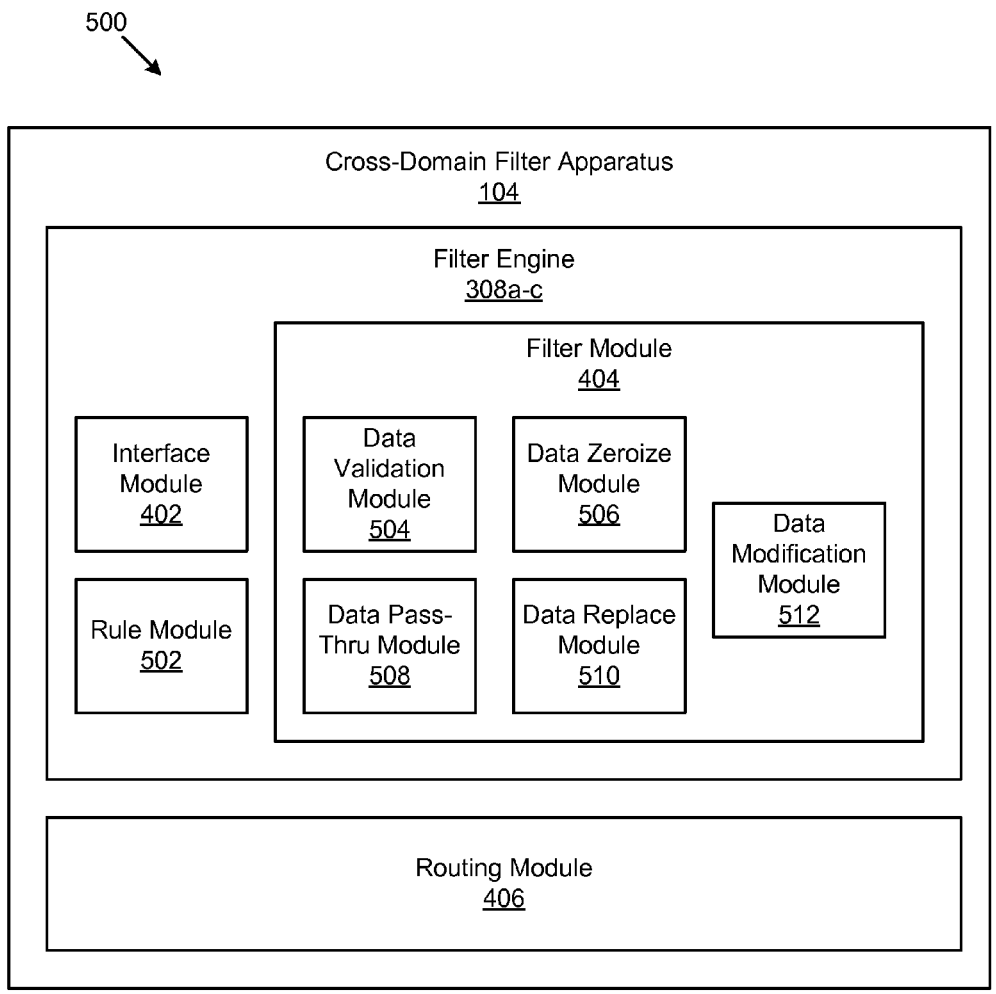
FIG. 5 is a schematic block diagram illustrating one embodiment of another cross-domain filter apparatus.

FIG. 5 depicts one embodiment of another apparatus 500 that includes a cross-domain filter apparatus 104. In certain embodiments, the cross-domain filter apparatus 104 includes one or more filter engines 308a-c, an interface module 402, a filter module 404, and a routing module 406, which are substantially similar to the filter engines 308a-c, the interface module 402, the filter module 404, and the routing module 406 described above with reference to FIG. 4. The cross-domain filter apparatus 104, in a further embodiment, includes a rule module 502, a data validation module 504, a data zeroize module 506, a data pass-thru module 508, a data replace module 510, and a data modification module 512, which are described in more detail below. In certain embodiments, the interface module 402, the filter module 404, with its associated modules 504-512, and the rule module 502 are located on the filter engine 308a-c.

In another embodiment, the cross-domain filter apparatus 104 includes a rule module 502 configured to determine the one or more rules of the rule file to apply to the message data. In one embodiment, each message rule is used to filter a message to verify the message can be transferred from one security level to another security level. In certain embodiments, a rule file includes a plurality of message rules, with each rule comprising one or more rule nodes. A rule node, in some embodiments, corresponds to a data field within the message data, such that the filter module 404 can determine whether the data field complies with its corresponding rule node. If not, the filter module 404 discards the message without forwarding the message to the destination security module 306a-c.

In one embodiment, the filter module 404 compares one or more predetermined match fields, and/or one or more values associated with a match field, associated with the message data with one or more predetermined match fields, and/or one or more values associated with a match field, associated with an applicable rule determined by the rule module 502. For example, message data may include a predetermined primary match field that begins at byte-4 and a secondary match field that begins at byte-12. The values of the byte fields can then be compared against corresponding primary and secondary match field values within a rule. For example, the rule may specify that the primary match field should have the value of '10' and the secondary match field should have the value of '20'. The filter module 404, in the previous example, compares the actual data values in the primary and secondary data fields to the values defined in the message rule (e.g., '10' and '20') to determine whether the message data complies with the message rule.

In certain embodiments, the rule module 502 selects a rule in response to the one or more predetermined match fields, and/or the one or more match field values, associated with the message data matching the one or more predetermined match fields, and/or the one or more match field values, associated with the rule. In some embodiments, the message data includes one or more different match fields associated with one or more different rules. For example, Rule A has a primary match field that begins at byte-4 and Rule B has a primary match field that begins at byte-8. In this manner, the rule module 502 validates that the message data corresponds to the one or more rules. In some embodiments, if the rule module 502 fails to determine at least one rule within the rule file, the rule module 502 discards the message in order to prevent the message from being forwarded to a second security module 306a-c.

The filter module 404, in one embodiment, includes one or more modules 504-512 configured to perform various filter actions on the message data. In certain embodiments, the message rule associated with the message determines which, if any, of the filter actions performed by modules 504-512 are to be performed on the data. In some embodiments, more than one filter action performed by modules 504-512 is performed on the message data. Even though modules 504-512 perform specific filter actions, one of skill in the art will recognize other filter actions that the filter module 404 can perform on the message data. Thus, the filter module 404 may scale to include other filtering actions that are not enumerated herein, but may be known to one of skill in the art.

The data validation module 504, in one embodiment, is configured to verify that the message data complies with one or more rules associated with the message. As described above, the filter module 404 compares one or more rules, and in particular, one or more rule nodes within a rule, to one or more corresponding data fields to determine whether the values of the data fields match the desired values as defined by the rules. If the data values and the defined values do not match, in certain embodiments, the filter module 404 discards the message without forwarding it to a destination security module 306a-c.

The data zeroize module 506, in one embodiment, is configured to sanitize message data by zeroing-out certain bytes and/or bits of sensitive message data according to a rule. For example, a rule may describe particular data fields containing sensitive data that should be sanitized for the particular message type being sent to a security module 306a-c. Thus, the rule, in this example, may require that bytes, 8, 16, 32, 64, and 128 be overwritten with zeroes because those bytes contain sensitive message data not intended to be accessed by a recipient having a security classification level associated with the destination security module 306a-c.

The data pass-thru module 508, in a further embodiment, is configured to forward received data to a destination security module 306a-c. In one embodiment, the data pass-thru module 508 does not perform any data validation, comparison, or modification, but instead forwards the received data to the destination security module 306a-c, as defined by the message rule. Thus, the message rule may simply specify that certain data be immediately forwarded to the destination security module 306a-c without further processing such that the output data is the same as the received data.

In one embodiment, the data replace module 510 is configured to replace the values of specified message data fields with different values, as defined by the message rule. For example, the rule may specify that the value of the data byte-8, which is currently '10', be replaced with the value of '9'. Thus, the data replace module 510 would change the value of the data at byte-8 to be the value of '9'.

In a further embodiment, the data modification module 512 is configured to modify the values of the message data by performing a modification operation on the values according to the message rule. For example, a message rule may specify that the value of data at byte-8, which may be a float with a value of '2.5', be rounded down (e.g. "floored") to make the data field comply with the rule. Thus, the data modification module 512 would round the data value down to the nearest integer, which in this example would be '2'. In some embodiments, other modification operations, as defined by the message rule, include rounding up/down, multiplying by a factor, dividing by a factor, adding a value, subtracting a value, and/or the like. In one embodiment, after the data modification module 512 modifies the data, the type of the data (e.g., char, int, float, double, or the like) is not modified, only the value of the data type.

Figure 6:
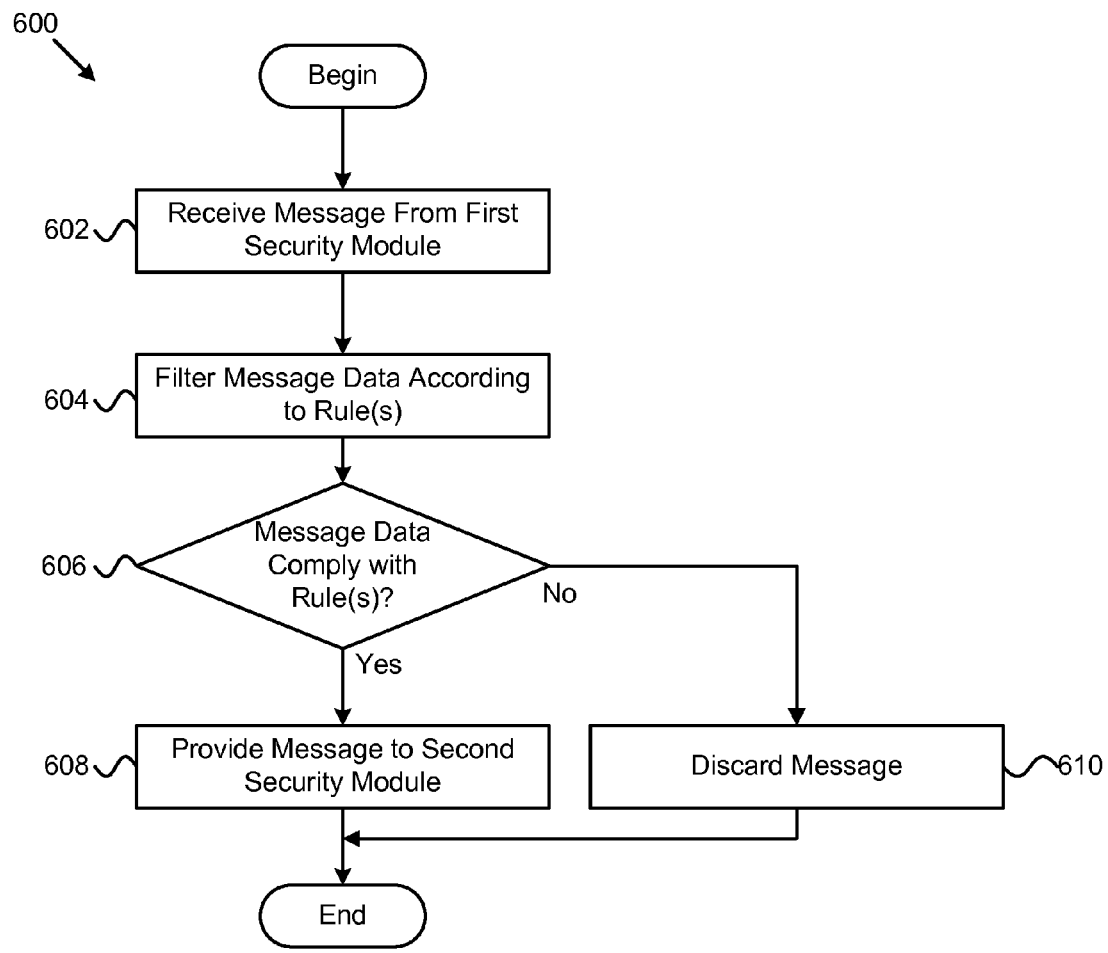
FIG. 6 is a schematic flow diagram illustrating one embodiment of a method for hardware-based filtering in a cross-domain infrastructure.

FIG. 6 depicts one embodiment of a method 600 for hardware-based filtering in a cross-domain infrastructure. The method 600 begins and, in one embodiment, the interface module 402 receives 602 a message from a first security module 306a-c. In some embodiments, the interface module 402 receives 602 the message by a physical interface, such as a PCI/DMA interface. The filter module 404, in a further embodiment, filters 604 the message data according to one or more rules associated with the message.

In certain embodiments, the filter module 404 determines 606 whether the message data complies with the one or more rules associated with the message. If the filter module 404 determines 606 the message data does not comply with one or more message rules, the filter module 404 discards 610 the message and the method 600 ends. Otherwise, if the filter module 404 determines 606 the message data complies with the one or more rules associated with the message, the routing module 406 provides 608 the message to a second security module 306a-c, and the method 600 ends.

Figure 7:
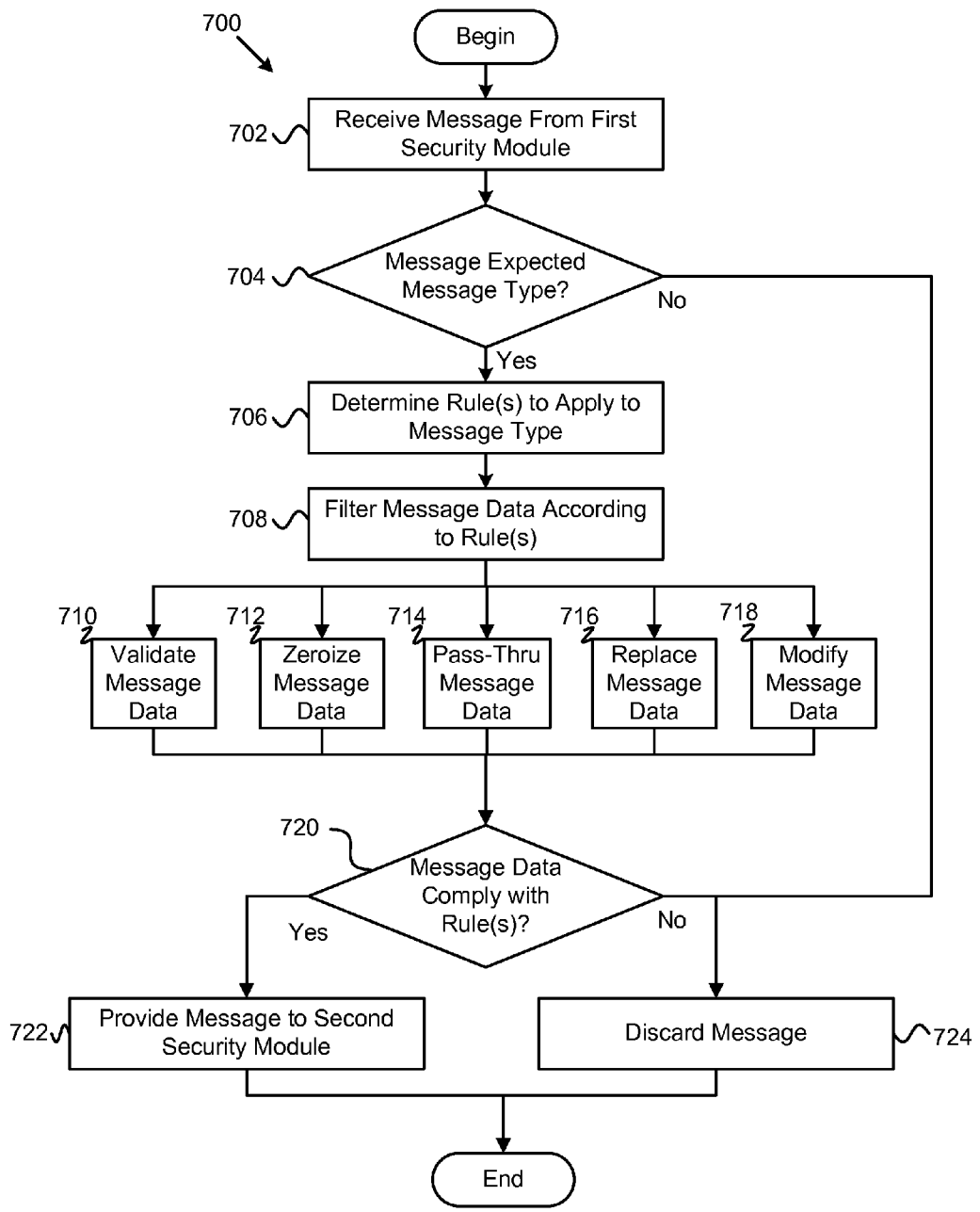
FIG. 7 is a schematic flow diagram illustrating one embodiment of another method for hardware-based filtering in a cross-domain infrastructure.

FIG. 7 depicts one embodiment of another method 700 for hardware-based filtering in a cross-domain infrastructure. In one embodiment, the method 700 begins and the interface module 402 receives 702 a message from a first security module 306a-c. In some embodiments, the interface module 402 receives 702 the message by a standard bus interface, such as a PCI/DMA interface.

In one embodiment, the interface module 402 determines 704 whether the message matches an expected message type. If the interface module 402 determines 704 the message is not an expected message type, the interface module 402 discards 724 the message and the method 700 ends. Otherwise, if the interface module 402 determines 704 the message is an expected message type, the filter module 404 determines 706 a rule file associated with the message. In some embodiments, the rule file includes one or more rules to apply to the message data.

In one embodiment, the rule module 502 determines one or more rules in the rule file to apply to the message data. In some embodiments, the rule module 502 compares one or more predetermined match fields, and/or one or more predetermined match field values, in the message data to one or more corresponding predetermined match fields, and/or one or more match field values, in the rules in order to determine if a rule applies to the message data.

A filter module 404 filters 708 the message data according to the one or more rules associated with the message. In certain embodiments, the filter module 404 validates 710 the message data, using a data validation module 504, by comparing the values of the bytes and/or bits of the message data to the requirements in the rules, which describe what the values of particular bytes and/or bits should be. In another embodiment, the filter module 404 zeroizes 712 the message data, using a data zeroize module 506, by zeroing-out certain bytes and/or bits of sensitive message data according to a rule. In a further embodiment, the filter module 404, using a data pass-thru module 508, forwards 714 received data to a destination security module 306a-c without performing any data validation, comparison, or modification.

In one embodiment, the filter module 404, replaces 716 message data, using a data replace module 510, by replacing values of specified message data fields with different values, as defined by the message rule. In some embodiments, the filter module 404, using a data modification module 512, modifies 718 message data in response to the message data not complying with one or more message rules by performing a modification operation on the data, such as rounding, adding, subtraction, or the like, as defined by the message rules.

In one embodiment, the filter module 404 determines 720 whether the message data complies with the rules associated with the message. If the filter module 404 determines 720 the message data does not comply with the rules, the filter module 404 discards 724 the message and the method 700 ends. Otherwise, if the filter module 404 determines 720 the message data complies with the rules, a routing module 406 provides 722 the message to a second security module 306a-c and the method 700 ends.

As will be appreciated by one skilled in the art, aspects of the present invention are be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for hardware-based filtering in a multi-level secure cross-domain infrastructure, the apparatus comprising:
   a programmable logic device comprising a filter engine, the filter engine in communication with a first security module, the programmable logic device being separate from a processor of a single board computer operably coupled to the programmable logic device such that processing associated with the filter engine is offloaded from the processor of the single board computer to the programmable logic device;
   an interface module of the filter engine configured to receive a message from the first security module, the message being sent from the first security module to a second security module, wherein the second security module comprises a different security classification than the first security module;
   a filter module of the filter engine configured to filter message data contained within the message according to a message rule, the message rule defining a data compliance requirement associated with the security classification of the second security module, the message rule being located in a rule file comprising a plurality of message rules, the rule file being dynamically determined based on one or more characteristics of the message; and
   a routing module configured to provide the message to the second security module in response to the message data complying with the message rule.

2. The apparatus of claim 1, wherein the first security module and the second security module are located on a single programmable logic device, the single programmable logic device in communication with the programmable logic device comprising the filter engine.

3. The apparatus of claim 1, wherein the first security module is located on a first programmable logic device and the second security module is located on a second programmable logic device, the first and second programmable logic devices in communication with the programmable logic device comprising the filter engine.

4. The apparatus of claim 1, further comprising:
   a third security module having a different security classification than each of the first and second security modules, the third security module in communication with a third filter engine;
   an interface module of the third filter engine configured to receive a message from the third security module, the message being sent from the third security module to one of the first security module and the second security module; and
   a filter module of the third filter engine configured to filter data contained within the message according to a message rule, the message rule defining a data compliance requirement associated with the security classification of one of the first and second security modules;
   wherein the routing module provides the message data to one of the first and second security modules in response to the message data complying with the message rule.

5. The apparatus of claim 1, wherein the programmable logic device comprising the filter engine comprises one or more functional partitions, wherein each functional partition comprises a filter engine associated with a security module, a filter engine executing an instance of a filtering firmware.

6. The apparatus of claim 1, wherein the programmable logic device comprising the filter engine comprises one or more physical partitions, and wherein each physical partition comprises a filter engine associated with a security module, the filter engine executing an instance of a filtering firmware.

7. The apparatus of claim 1, wherein the interface module verifies the message comprises an expected message type, wherein the message type is associated with a rule file comprising one or more rules.

8. The apparatus of claim 1, wherein the interface module checks a configuration table for a rule file, the configuration table storing one or more rule files associated with a message type, wherein the message type is an index into the configuration table.

9. The apparatus of claim 1, further comprising a rule module configured to determine a rule associated with the message, the rule being selected from a rule file, wherein one or more predetermined match fields associated with the message data are compared with one or more predetermined match fields associated with a rule, wherein the rule is selected in response to the predetermined match fields associated with the message data matching the predetermined match fields associated with the rule.

10. The apparatus of claim 1, wherein the filter module performs a filtering action on the message data, the filtering action being specified according to the message rule, wherein the filtering action comprises:
   a validation action verifying the message data complies with the message rule, the message data being compared to the message rule;
   a data zeroizing action zeroing-out message data according to the message rule;
   a data pass-thru action forwarding the message data to the second security module without processing the message data;
   a data replace action replacing a value of the message data with a different value; and
   a data modification action modifying a value of the message data by performing a modification operation on the value.

11. A method for hardware-based filtering in a multi-level secure cross-domain infrastructure, the method comprising:
   receiving a message from a first security module at a filter engine located on a programmable logic device, the message being sent from the first security module to a second security module, wherein the second security module comprises a different security classification than the first security module, the programmable logic device being separate from a processor of a single board computer operably coupled to the programmable logic device such that processing associated with the filter engine is offloaded from the processor of the single board computer to the programmable logic device;

filtering data contained within the message according to a message rule, the message rule defining a data compliance requirement associated with the security classification of the second security module, the message rule being located in a rule file comprising a plurality of message rules, the rule file being dynamically determined based on one or more characteristics of the message; and providing the message to the second security module in response to the message data complying with the message rule.

12. The method of claim 11, wherein the first security module and the second security module are located on a single programmable logic device, the single programmable logic device in communication with the programmable logic device comprising the filter engine.

13. The method of claim 11, wherein the first security module is located on a first programmable logic device and the second security module is located on a second programmable logic device, the first and second programmable logic devices in communication with the programmable logic device comprising the filter engine.

14. The method of claim 11, wherein the programmable logic device comprising the filter engine comprises one or more functional partitions, wherein each functional partition comprises a filter engine associated with a security module, a filter engine executing an instance of a filtering firmware.

15. The method of claim 11, wherein the programmable logic device comprising the filter engine comprises one or more physical partitions, and wherein each physical partition comprises a filter engine associated with a security module, the filter engine executing an instance of a filtering firmware.

16. The method of claim 11, further comprising verifying the message comprises an expected message type, wherein the message type is associated with a rule file comprising one or more rules.

17. The method of claim 11, further comprising checking a configuration table for a rule file, the configuration table storing one or more rule files associated with a message type, wherein the message type is an index into the configuration table.

18. The method of claim 11, further comprising determining a rule associated with the message, the rule being selected from a rule file, wherein one or more predetermined match fields associated with the message data are compared with one or more predetermined match fields associated with a rule, wherein the rule is selected in response to the predetermined match fields associated with the message data matching the predetermined match fields associated with the rule.

19. The method of claim 11, further comprising performing a filtering action on the message data, the filtering action being specified according to the message rule, wherein the filtering action comprises:

a validation action verifying the message data complies with the message rule, the message data being compared to the message rule;

a data zeroizing action zeroing-out message data according to the message rule;

a data pass-thru action forwarding the message data to the second security module without processing the message data;

a data replace action replacing a value of the message data with a different value; and a data modification action modifying a value of the message data by performing a modification operation on the value.

20. A system for hardware-based filtering in a multi-level secure cross-domain infrastructure, the system comprising:

a single board computer comprising a first security module;

a programmable logic device comprising a filter engine, the filter engine in communication with the first security module, the programmable logic device being separate from a processor of the single board computer such that processing associated with the filter engine is offloaded from the processor of the single board computer to the programmable logic device;

an interface module of the filter engine configured to receive a message from the first security module, the message being sent from the first security module to a second security module, wherein the second security module comprises a different security classification than the first security module;

a filter module of the filter engine configured to filter data contained within the message according to a message rule, the message rule defining a data compliance requirement associated with the security classification of the second security module, the message rule being located in a rule file comprising a plurality of message rules, the rule file being dynamically determined based on one or more characteristics of the message; and a routing module configured to provide the message to the second security module in response to the message data complying with the message rule.

21. The system of claim 20, further comprising a network interface controller ("NIC") configured to receive a network packet comprising a security classification label, the network packet being received at a offload engine on the NIC, the offload engine having a same security classification as the network packet, the network packet comprising a message, the message being forwarded to a security module on the single board computer having a same security classification as the network packet.

* * * * *